(12) United States Patent
Heinz et al.

(10) Patent No.: US 7,390,867 B2
(45) Date of Patent: Jun. 24, 2008

(54) ISOCYANATE ADDUCTS

(75) Inventors: Marion Heinz, Bernsdorf (DE); Udo Rotermund, Ortrand (DE); Peter Huntemann, Stemshorn (DE); Udo Schilling, Diepholz (DE)

(73) Assignee: BASF SE, Ludwigshafen (DE)

( * ) Notice: Subject to any disclaimer, the term of this patent is extended or adjusted under 35 U.S.C. 154(b) by 57 days.

(21) Appl. No.: 10/735,426

(22) Filed: Dec. 12, 2003

(65) Prior Publication Data

US 2004/0127672 A1 Jul. 1, 2004

(30) Foreign Application Priority Data

Dec. 17, 2002 (DE) ................................ 102 59 267

(51) Int. Cl.
*C08G 18/48* (2006.01)
*C08J 9/32* (2006.01)

(52) U.S. Cl. ................ 528/77; 521/122; 521/128; 521/129; 521/137; 521/170; 521/172; 521/173; 521/174; 521/176; 528/76; 528/80; 528/85

(58) Field of Classification Search ........... 521/122, 521/128, 129, 137, 170, 172, 173, 174, 176; 528/76, 77, 80, 85
See application file for complete search history.

(56) References Cited

U.S. PATENT DOCUMENTS

| | | | |
|---|---|---|---|
| 5,063,253 A * | 11/1991 | Gansen et al. ............... 521/159 |
| 5,601,881 A | 2/1997 | Grimm et al. | |
| 5,798,533 A * | 8/1998 | Fishback et al. ....... 252/182.25 |
| 6,387,447 B1 | 5/2002 | Grimm et al. | |
| 2001/0051261 A1 * | 12/2001 | Bartz et al. ............... 428/318.6 |
| 2003/0134920 A1 * | 7/2003 | Poisl et al. .................... 521/59 |
| 2004/0087739 A1 * | 5/2004 | Onder ......................... 525/453 |

FOREIGN PATENT DOCUMENTS

| | | |
|---|---|---|
| DE | 197 30 466 A1 | 1/1999 |
| EP | A 636 467 | 2/1995 |
| WO | WO-A 96/28684 | 9/1996 |
| WO | WO 99/03922 | 1/1999 |

OTHER PUBLICATIONS

Sax et al.; Hawley's Condensed Chemical Dictionary, Eleventh Edition; Van Nostrand Reinhold; New York; 1987; pp. 31 and 940.*

* cited by examiner

*Primary Examiner*—Rabon Sergent
(74) *Attorney, Agent, or Firm*—Fernando A. Borrego

(57) ABSTRACT

The invention relates to isocyanate adducts which can be prepared by reacting at least one polyisocyanate with compounds having at least two hydrogen atoms which are reactive toward isocyanate groups and have a crystalline content of less than 10 J/g determined by differential scanning calorimetry in accordance with DIN 51 004 at 20 K/min from room temperature to 250° C. using a nitrogen flow of 3 l/h as carrier gas and an aromatics content reported as carbon atoms in aromatic rings of less than 31% by weight, based on the total weight of the isocyanate adducts.

10 Claims, No Drawings

ISOCYANATE ADDUCTS

The present invention relates to essentially compact isocyanate adducts having a low thermal conductivity.

Polymers prepared by reaction of polyisocyanates, hereinafter referred to as isocyanate adducts, are used in many industrial fields. Isocyanate adducts include, for example, polyurethanes, polyisocyanurates and polyureas.

An important field of application for isocyanate adducts is thermal insulation, for example for refrigeration appliances, buildings or pipes. Foamed isocyanate adducts are used for this field of application. For particular applications, for example pipe insulation in the off-shore sector, essentially unfoamed isocyanate adducts are used as insulating material. In the case of such compact materials, the insulating action is effected by the polymer matrix.

Since the insulating action provided by the polymer matrix is in many cases insufficient, fillers are frequently used to improve the insulating action of such materials.

Thus, WO 96/28684 describes polymers in which barium sulfate is used as high-density filler. However, a low thermal conductivity cannot be achieved by means of this filler.

According to DE 197 30 466, a matrix of isocyanate adducts which contain isocyanurate groups and have been prepared at an index of about 1000 using alkali metal acetate as catalyst is used. The matrix of the resulting product has a thermal conductivity of far above 0.200 W/m*K. Even a high concentration of hollow glass microspheres in the product reduces the thermal conductivity only to a value of about 0.140 W/mK. For the purposes of the present invention, the "index" is the ratio of the amount of isocyanate effectively used to the stoichiometrically calculated amount of isocyanate.

WO 99/03922 and U.S. Pat. No. 6,387,447 describe the sheathing of pipes with polyurethanes both by the rotation process and by the classical process of casting in a mold. These pipes are employed in the off-shore sector. Sheathing compositions comprising polyurethane or polyisocyanurate filled with hollow microspheres having a compressive strength of >10 bar are claimed. These insulating coatings filled with hollow microspheres are said to have thermal conductivities of <0.180 W/m*K. The effect of hollow microspheres in reducing the thermal conductivity is known and understandable since the hollow microspheres themselves have a thermal conductivity lower than that of the polymer matrix and the overall thermal conductivity is an additive function of the thermal conductivities of the polymer matrix and the hollow microspheres.

EP 636 467 describes a process for producing off-shore pipes. Here, the polyurethane is applied to the pipes using a rotating nozzle. To carry out the process, it is necessary for the formative components to flow well. The isocyanate used for preparing the polyurethane system described for producing the pipes is a prepolymer derived from monomeric diphenylmethane diisocyanate (MDI). The amount of isocyanate used in the formulations described is about 55% by weight and therefore very high. Such formulations usually give very good mechanical properties, but the thermal conductivity is too high for many applications.

Since only a limited quantity of fillers can be incorporated into the polyurethane in order to give a low thermal conductivity without having an adverse effect on the mechanical properties, the reduction which can be achieved in the thermal conductivity in this way is limited.

It is an object of the present invention to provide isocyanate adducts whose polymer matrix has a low thermal conductivity without there being disadvantages in the processing or the mechanical properties of the isocyanate adducts.

We have surprisingly found that a matrix comprising isocyanate adducts, in particular polyurethane, which have a crystalline content of less than 10 J/g measured by means of differential scanning calorimetry in accordance with DIN 51 004 at 20 K/min from room temperature to 250° C. using a nitrogen flow of 3 l/h as carrier gas and have an aromatics content reported as carbon atoms in aromatic rings of less than 31% by weight has a low thermal conductivity. The measurements were carried out using a "DSC 7" instrument from Perkin Elmer Instruments.

The present invention accordingly provides isocyanate adducts which can be prepared by reacting at least one polyisocyanate with compounds having at least two hydrogen atoms which are reactive toward isocyanate groups and have a crystalline content of less than 10 J/g determined by differential scanning calorimetry in accordance with DIN 51 004 at 20 K/min from room temperature to 250° C. using a nitrogen flow of 3 l/h as carrier gas and an aromatics content reported as carbon atoms in aromatic rings of less than 31% by weight, based on the total weight of the isocyanate adducts.

For the purposes of the present invention, the polymer matrix is the solid polymer material made up of the reaction product of polyol component and isocyanate component minus fillers and voids.

The crystalline content of the isocyanate adducts is preferably <7 J/g, particularly preferably <3 J/g, in particular not detectable. The detection limit of the indicated method in accordance with DIN 51004 is about 0.5 J/g.

The aromatics content is preferably in the range from 5% by weight to 31% by weight, in particular from 10 to 20% by weight, in each case based on the polymer matrix.

Even without the addition of fillers such as hollow microspheres, in particular hollow glass microspheres, such isocyanate adducts have thermal conductivities of less than 0.20 W/m*K, preferably less than 0.19 W/m*K, particularly preferably <0.18 W/m*K, at 23° C., determined by the hot wire method published by Ebert H.-P. et al. High Temp.-High Press, 1993, 25, 391-402. A detailed description of this method is given further below.

In a preferred embodiment of the invention, these isocyanate adducts can be prepared by reacting a) at least bifunctional isocyanates with b) at least one compound having at least two reactive hydrogen atoms in the presence of c) catalysts, wherein the compounds having reactive hydrogen atoms b) comprise at least one polyetherol bi) having a functionality greater than 2.5, preferably greater than 3, particularly preferably greater than 4, and a molar mass greater than 300 g/mol, preferably from 300 to 1000 g/mol, particularly preferably from 300 to 700 g/mol, and at least one polyol bii) having a molar mass greater than 1000 g/mol, preferably greater than 2000 g/mol, and a functionality of from 1.7 to 3 and the reaction is carried out at an index of less than 200. To achieve a low thermal conductivity, preference is given to employing an index of less than 130, particularly preferably less than 110, in particular below 90.

The polyetherol bi) is preferably used in an amount of from 0.1 to 80 parts by weight and the polyetherol bii) is preferably used in an amount of from 0.1 to 99.9 parts by weight, in each case based on the component b).

In addition to the polyether alcohols bi) and bii), the component b) may further comprise additional compounds having at least two hydrogen atoms which are reactive toward isocyanate groups.

Thus, the component b) can further comprise at least one polyetherol biii) having a molar mass of less than 1000 q/mol and a functionality of less than 2.5. If a polyetherol biii) is used, it can be employed in an amount of from 0.1 to 95 parts by weight, based on the component b).

The polyether alcohols are prepared by customary and known methods by addition of alkylene oxides onto H-functional starter substances. As alkylene oxides, use is mostly made of ethylene oxide and/or propylene oxide, either individually or as any mixtures with one another. It is in principle also possible to use butylene oxide or other higher alkylene oxides. The addition reaction of the alkylene oxides is usually carried out in the presence of catalysts. Catalysts used in industry are mainly basic substances, in particular alkali metal hydroxides, or multimetal cyanide compounds, also known as DMC catalysts.

Starters which can be used for preparing the polyether alcohols bi) are, preferably, trimethylolpropane, glycerol, sucrose, sorbitol, sorbitol/propylene glycol, sucrose/glycerol/water, sucrose/diethylene glycol, sucrose/glycerol, sucrose/pentaerythritol/diethylene glycol, sucrose/triethanolamine, ethylenediamine, vicinal TDA and further customary high-functionality starters and/or mixtures thereof. Intermediates prepared from the abovementioned starters and an alkylene oxide in a separate process step can also be used as starters.

Alkylene oxides used are, as described above, usually propylene oxide and/or ethylene oxide. The alkylene oxides can be used individually or as any mixtures with one another, and in the case of mixtures the alkylene oxides can be added on individually in succession or as a random mixture.

Starters which can be used for preparing the polyether alcohols bii) are, preferably, propylene glycol, ethylene glycol, diethylene glycol, glycerol, glycerol/water, trimethylol propane, triethanolamine, dipropylene glycol, castor oil.

Here too, alkylene oxides used are usually propylene oxide and ethylene oxide. The alkylene oxides can be used either individually or as any mixtures with one another, and in the case of mixtures the alkylene oxides can be added on individually in succession or as a random mixture.

Starters which can be used for preparing the polyether alcohols biii) are, preferably, propylene glycol and/or ethylene glycol. Here too, propylene oxide and/or ethylene oxide are preferred as alkylene oxides.

The polyesterols biv) are prepared by customary methods by condensation of polyfunctional carboxylic acids with polyfunctional alcohols. Preference is given to using esterification products of adipic acid and neopentyl glycol; adipic acid and propylene glycol; adipic acid and diethylene glycol; adipic acid, ethylene glycol and propylene glycol; adipic acid, ethylene glycol and diethylene glycol; adipic acid, ethylene glycol and 1,4-butanediol; adipic acid, diethylene glycol and trimethylolpropane; adipic acid, phthalic anhydride, propylene glycol and trimethylolpropane; adipic acid and dipropylene glycol; adipic acid, phthalic anhydride, oleic acid and trimethylol propane; adipic acid, isophthalic acid and 1,6-hexanediol; or phthalic anhydride, diethylene glycol and ethylene glycol.

The crystallinity of the polyesterols biv), determined by DSC, should display no melting peak or a heat of fusion up to a maximum of 7 J/g.

For particular applications, it is advantageous for the component b) to further comprise at least one chain extender by). As chain extenders, preference is given to using bifunctional alcohols having a molecular weight in the range from 62 to 400 g/mol. Dipropylene glycol, propylene glycol, neopentyl glycol and other diols having predominantly nonterminal OH groups, for example 1,2-pentanediol or 2,3-pentanediol, have been found to be particularly useful.

As at least bifunctional isocyanates a), particular preference is given to using isocyanates based on MDI and having a functionality of >2.0. Examples are mixtures of 4,4'-MDI containing a proportion of isomers and higher-functional oligomers. Suitable at least bifunctional isocyanates include isocyanates or prepolymers based on polymeric MDI as marketed by BASF AG under the names Lupranat®M 10, Lupranat®M 20, Lupranat®M 50, Lupranat®M 70, Lupranat®M 200, or mixtures or prepolymers thereof. The NCO content of the at least bifunctional isocyanates a) should be in the range from 25 to 32% by weight. The functionality of the at least bifunctional isocyanates a) should be>2, preferably from 2.1 to 3.0.

It is also possible to use oligomers based on MDI as marketed by BASF AG under the name Lupranat® MM 103. The amount of isocyanates used is determined by the index at which the reaction is carried out. In general, the amount of isocyanate used should be less than 54% by weight, based on the weight of the isocyanate adduct.

As catalysts, it is possible to use the customary and known urethane formation catalysts. Particular preference is given to using tertiary amines such as tri-n-propylamine, triethylamine, triisopentylamine, diethylbenzylamine, dimethylcyclohexylamine or methylmorpholine in the process of the present invention. If isocyanurate groups are also to be incorporated in the isocyanate adducts, concomitant use is made of customary trimerization catalysts such as Dabco® TMR 3 (N-hydroxyalkyl quaternary ammonium carboxylate), Lupragen N 600 (1,3,5-tris(3-dimethylaminopropyl)hexahydro-s-triazine), potassium acetate.

If necessary, the thermal conductivity of the isocyanate adducts of the present invention can be decreased further by addition of fillers. Preferred fillers are hollow microspheres. Examples are hollow glass microspheres, for example Scotchlite™ GlassBubbles from 3 M, hollow polymer microspheres, for example Expancel® from AKZO NOBEL, or hollow ceramic microspheres, for example Cenospheres® from Sphere Services INC. The addition of such fillers enables the thermal conductivity of the isocyanate adducts of the present invention to be reduced to values of less than 0.14 W/m*K.

If necessary, further customary auxiliaries and/or additives as are customary in polyurethane chemistry can also be used.

The isocyanate adducts of the present invention are particularly suitable for use as pipe insulation in the off-shore sector, but can also be employed in ship construction, in sandwich plate systems and in the building industry as insulation around doors and windows.

To prepare the isocyanate adducts of the present invention, the isocyanate a) and the compounds b) having at least two hydrogen atoms which are reactive toward isocyanate groups are firstly mixed with one another. This can be done manually, but is preferably carried out using known mixing apparatuses, in particular mixing heads. It is customary in practice to add the catalysts c) and any fillers and other auxiliaries and/or additives used to the compounds b) having at least two hydrogen atoms which are reactive toward isocyanate groups. This mixture is usually referred to as polyol component.

The application of the reaction mixture to the surfaces to be coated is carried out by known methods. Examples ate the rotation casting process, casting in a mold and the mixing pot process.

In the rotation casting process, a thixotropic reaction mixture is poured by means of a film nozzle onto a pipe which is rotating about its axis and the desired coating thickness is set via the speed at which the nozzle is advanced.

In casting in a mold, a pretreated section of pipe is laid in a heated mold which has been treated with mold release agents, the mold is closed, inclined and filled from the lowest point via a hose until the reacting polyurethane mixture comes out of the mold at the highest point.

In the mixing pot process, a reacting polyurethane system which has been premixed by means of a PUR metering machine is introduced into a mixing pot which is open at the bottom. At the same time, a defined amount of hollow microspheres is metered in by means of a screw metering device. The reaction mixture can be applied to a rotating pipe or introduced into a mold via a regulatable outlet orifice.

The thermal conductivities reported in the examples were determined by the dynamic hot wire method. Here, the wire embedded in the specimen serves simultaneously as heating element and temperature sensor. During the measurement, the wire is heated by means of a constant electric power. The mean temperature of the hot wire as a function of time can be measured by means of the temperature-dependent resistance of the wire. This temperature dependence depends on the thermal conductivity of the specimen. The thermal conductivity of the specimen is determined by fitting an analytical solution published by Ebert H.-P. et al. High Temp.-High Press, 1993, 25, 391-402, to this time-dependent temperature curve taking into account the thermal contact resistance between specimen and wire and heat losses in the axial direction.

The isocyanate adducts of the present invention are essentially compact and their thermal conductivities are so low that they can in principle be used for thermal insulation purposes even without addition of fillers. They can be prepared without problems on customary plants.

The invention is illustrated by the following examples.

COMPARATIVE EXAMPLE 1

Component A 95.0 parts by weight of polyether alcohol, OH number 490, prepared by polyaddition of 70% of propylene oxide onto sorbitol
5.0 parts by weight of zeolite paste
0.7 part by weight of dimethylcyclohexylamine Component B 125 parts by weight of Lupranat ® MM 103
mixing ratio A:B = 100:124
thermal conductivity: 0.243 W/m*K

COMPARATIVE EXAMPLE 2

Component A 95.0 parts by weight of polyether alcohol, OH number 490, prepared by polyaddition of 66% of propylene oxide onto sucrose/glycerol
5.0 parts by weight of zeolite paste
0.7 part by weight of dimethylcyclohexylamine Component B 125 parts by weight of Lupranat ® MM 103
mixing ratio A:B = 100:124
thermal conductivity: 0.256 W/m*K

COMPARATIVE EXAMPLE 3

Component A 100.0 parts by weight of polyester alcohol, esterification product of adipic acid and ethylene glycol, OH number 55,
11.0 parts by weight of 1,4-butanediol
1.0 part by weight of trimethylolpropane
1.0 part by weight of stabilizer Component B 47.5 parts by weight of Lupranat ® MES
mixing ratio A:B = 100:42
thermal conductivity: 0.208 W/m*K
crystallinity: 15 J/g

COMPARATIVE EXAMPLE 4

Component A 100.0 parts by weight of polyether alcohol, polytetrahydrofuran, OH number 56,
11.0 parts by weight of 1,4-butanediol
1.0 part by weight of trimethylolpropane
1.0 part by weight of stabilizer Component B 47.5 parts by weight of Lupranat ® MES
mixing ratio A:B = 100:42
thermal conductivity: 0.211 W/m*K
crystallinity: 13 J/g

EXAMPLE 1

Component A 43.9 parts by weight of polyether alcohol, OH number 104, prepared by polyaddition of propylene oxide onto propylene glycol
27.5 parts by weight of polyether alcohol, OH number 55, prepared by polyaddition of 86% of propylene oxide and 10% of ethylene oxide onto glycerol
18.0 parts by weight of dipropylene glycol
5.0 parts by weight of polyether alcohol, OH number 490, polyaddition of 70% of propylene oxide onto sorbitol -continued

```
5.0  parts by weight of zeolite paste
0.5  part by weight of DC-MA antifoam
0.1  part by weight of potassium acetate
                    Component B
```

Lupranat ® M 20 S
mixing ratio A:B = 100:60
index 101
thermal conductivity:   0.173 W/m*K
MDI content:            37.5%
aromatic content:       21.6%
crystallinity:          not detectable Addition of 19% by weight (in PUR) of 3M—Scotchlite Glasbubbles® S 32 resulted in a thermal conductivity of about 0.135 W/m*K.

EXAMPLE 2

Component A 26.25 parts by weight of polyether alcohol, OH number 104, prepared by polyaddition of propylene oxide onto propylene glycol
27.5 parts by weight of polyether alcohol, OH number 55, prepared by polyaddition of 86% of propylene oxide and 10% of ethylene oxide onto glycerol
14.7 parts by weight of dipropylene glycol
5.0 parts by weight of polyether alcohol, OH number 490, prepared by polyaddition of 70% of propylene oxide onto sorbitol
21.0 parts by weight of polyether alcohol, OH number 28, prepared by polyaddition of 14% of ethylene oxide and 84% of propylene oxide onto glycerol
5.0 parts by weight of zeolite paste
0.5 part by weight of DC-MA antifoam
0.05 part by weight of potassium acetate

Component B

Lupranat ® M 20 S
mixing ratio A:B = 100:50
index 101
thermal conductivity:   0.164 W/m*K
MDI content:            33.3%
aromatic content:       19.2% by weight
crystallinity:          not detectable

EXAMPLE 3

Component A 79.10 parts by weight of polyether alcohol, OH number 35, prepared by polyaddition of 84% of propylene oxide and 13% of ethylene oxide onto glycerol
15.90 parts by weight of polyether alcohol, OH number 490, prepared by polyaddition of 70% of propylene oxide onto sorbitol
5.0 parts by weight of zeolite paste
0.7 part by weight of dimethylcyclohexylamine

Component B

Lupranat M 20 W
mixing ratio A:B = 100:26.5
index 105
thermal conductivity:   0.179 W/m*K
MDI content:            20.9%
aromatic content:       12.0% by weight
crystallinity:          not detectable

EXAMPLE 4

Component A 81.40 parts by weight of polyether alcohol, OH number 35, prepared by polyaddition of 84% of propylene oxide and 13% of ethylene oxide onto glycerol
12.60 parts by weight of polyether alcohol, OH number 490, prepared by polyaddition of 66% of propylene oxide onto sucrose/glycerol
1.00 part by weight of propylene glycol
5.0 parts by weight of zeolite paste
0.5 part by weight of dimethylcyclohexylamine

Component B

Lupranat ® M 10 W
mixing ratio A:B = 100:26.1
index 105
thermal conductivity:   0.171 W/m*K
MDI content:            20.7%
aromatic content:       11.9% by weight
crystallinity:          not detectable

EXAMPLE 5

Component A 74.00 parts by weight of polyether alcohol, OH number 35, prepared by polyaddition of 84% of propylene oxide and 13% of ethylene oxide onto glycerol
5.00 parts by weight of polyether alcohol, OHN 490, prepared by polyaddition of 66% of propylene oxide onto sucrose/glycerol
6.00 parts by weight of dipropylene glycol
5.0 parts by weight of zeolite paste
10.0 parts by weight of 3M - Scotchlite Glass Bubbles K1
0.5 part by weight of dimethylcyclohexylamine

Component B

Lupranat ® M 20 W
mixing ratio A:B = 100:25.4
index 105
thermal conductivity:   0.110 W/m*K
MDI content:            20.3%
aromatic content:       11.7% by weight
crystallinity:          5.5 J/g

EXAMPLE 6

Component A 81.40 parts by weight of polyether alcohol, OH number 35, prepared by polyaddition of 84% of propylene oxide and 13% of ethylene oxide onto glycerol
12.60 parts by weight of polyether alcohol, OH number 490, prepared by polyaddition of 66% of propylene oxide onto sucrose/glycerol
1.00 part by weight of propylene glycol
5.0 parts by weight of zeolite paste
0.5 part by weight of dimethylcyclohexylamine

Component B

Lupranat ® M 20 W
mixing ratio A:B = 100:21.4
index 85
thermal conductivity:   0.162 W/m*K
MDI content:            16.9%

-continued

| | |
|---|---|
| aromatic content: | 9.7% by weight |
| crystallinity: | not detectable |

We claim:

1. An isocyanate adduct comprising the reaction product of at least one polyisocyanate, having a functionality >2, with compounds having at least two hydrogen atoms which are reactive toward isocyanate groups, the reaction product providing a polymer matrix that is essentially compact, wherein said adduct has a crystalline content of less than 10 j/g determined by differential scanning calorimetry in accordance with DIN 51 004 at 20 K/min from room temperature to 250° C. using a nitrogen flow of 3 l/h as carrier gas and an aromatics content reported as carbon atoms in aromatic rings of less than 31% by weight, based on the total weight of the isocyanate adduct, and wherein the compounds having reactive hydrogen atoms comprise at least one polyetherol bi) having a functionality greater than 3 and a molar mass 300 g/mol or greater.

2. An isocyanate adduct as claimed in claim 1 which has a thermal conductivity determined by a hot wire method at 23° C. of less than 0.2 W/m*K.

3. An isocyanate adduct as claimed in claim 1 further containing fillers.

4. An isocyanate adduct as claimed in claim 3, wherein the fillers are hollow microspheres optionally having a pressure loading of greater than 10 bar.

5. An isocyanate adduct as claimed in claim 3, wherein the fillers are hollow glass microspheres.

6. An isocyanate adduct as claimed in claim 3, wherein the fillers are hollow polymer microspheres.

7. An isocyanate adduct as claimed in claim 3, wherein the fillers are hollow ceramic micro spheres.

8. An isocyanate adduct as claimed in claim 1 which has a thermal conductivity determined by a hot wire method at 23° C. of less than 0.19 W/m*K.

9. An isocyanate adduct as claimed in claim 1, wherein the compounds having reactive hydrogen atoms further comprise at least one polyetherol bii) having a molar mass greater than 1000 g/mol and a functionality of from 1.7 to 3.

10. An isocyanate adduct as claimed in claim 9, wherein bi) is used in an amount of from 0.1 to 80 parts by weight and bii) is used in an amount of from 0.1 to 99.9 parts by weight, based in each case on the parts by weight of the compounds having reactive hydrogen atoms.

* * * * *